Sept. 29, 1970      A. C. PETITO      3,531,189

EYEGLASS FRAME

Original Filed Sept. 6, 1966      3 Sheets-Sheet 1

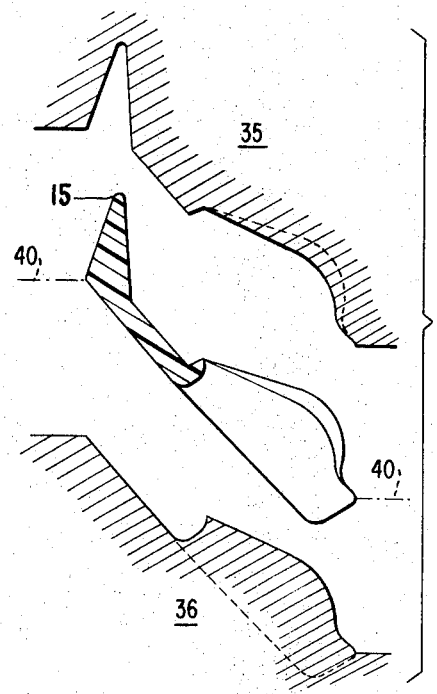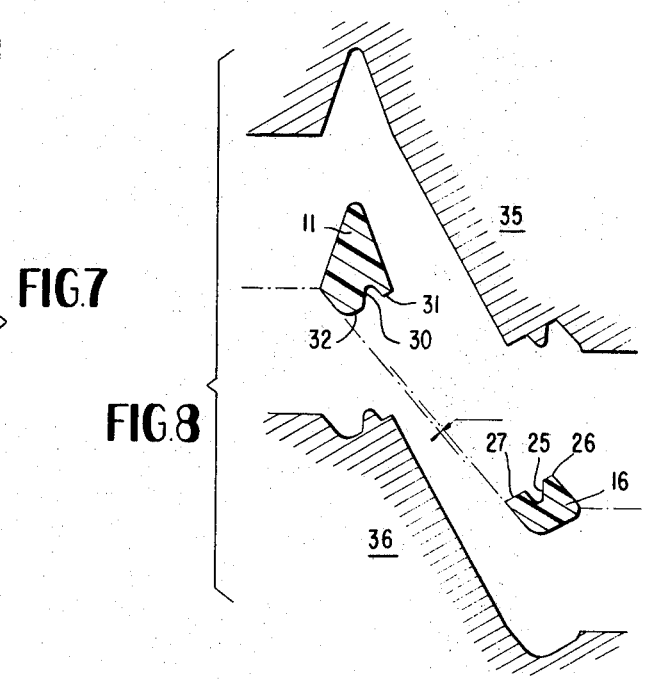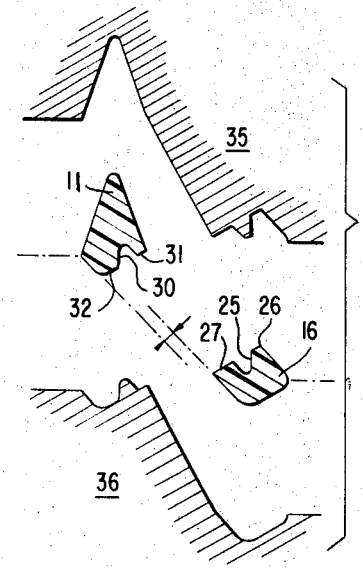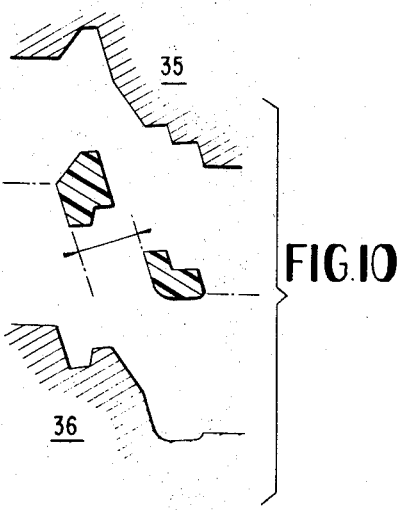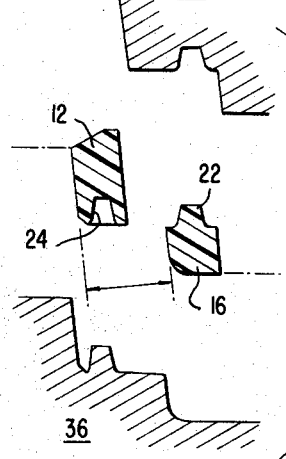

United States Patent Office 3,531,189
Patented Sept. 29, 1970

3,531,189
EYEGLASS FRAME
Albert C. Petito, Hudson, Mass., assignor to Foster Grant Co., Inc., Leominster, Mass., a corporation of Delaware
Continuation of application Ser. No. 577,321, Sept. 6, 1966. This application Sept. 2, 1969, Ser. No. 854,799
Int. Cl. G02c 1/08
U.S. Cl. 351—90
6 Claims

ABSTRACT OF THE DISCLOSURE

An eyeglass frame comprising a U-shaped lens frame and temple member in which the lens frame and lenses therein extend around the sides of the wearer's head a substantial amount. The frame includes lower rim portions which are so constructed so as to allow molding of the frame by a pair of simple mold blocks. The lower rim portions may be split at their ends away from the remainder of the frame and joined to the frames before inserting the lenses in their lens openings. Ledges forming grooves for receiving the lenses in the frame may terminate a substantial distance before the ends of the lens openings to allow insertion of lenses after joining of the split lower rims to the remainder of the frames.

---

This application is a continuation of application Ser. No. 577,321 filed Sept. 6, 1966, now abandoned.

This invention relates generally to the art of manufacturing eyeglass frames such as those of the sun and prescription type which may be manufactured by simplified molding and assembling procedures.

The formation of the undercut grooves is molded plastic eyeglass frames has long presented a major obstruction to the fast and economical molding of such frames. Although numerous devices have been advanced for forming such undercut grooves, these devices have not been entirely satisfactory, particularly for use in manufacturing economical eyeglass frames, in that they have generally been prohibitively expensive, required excessive operation time, or have required excessive maintenance to reliably produce quality frames. Moreover, these prior devices have not been readily adaptable to produce frames of the type wherein elongated curved lenses are extended around the temples, such as for example to protect the eye from peripheral glare and to provide unobstructed peripheral vision.

Another difficulty encountered in the manufacture of eyeglasses is the assembling of the lens in the lens-retaining groove of the frame. This is normally accomplished, particularly in the sunglass art, by springing or snapping the lens into place in the frame. This necessarily requires that close tolerances be maintained both on the size of the lens itself and on the lens retaining groove in the frame in order that the lens may be snapped into and firmly retained in the groove.

It is, therefore, an object of the present invention to provide an improved eyeglass frame having lens-retaining grooves which avoids the above mentioned difficulties encountered in the prior art.

Another object of this invention is to provide an improved eyeglass frame for receiving and supporting lens elements, which frame may be easily and inexpensively injection molded without the use of complex mold equipment.

A further object is to provide an improved eyeglass frame which avoids the necessity of maintaining the usual extremely close tolerances on the dimension of the lens element and on the dimension of the lens-retaining groove in the frame element.

In the attainment of the foregoing and other objects, an important feature of this invention resides in being able to mold eyeglass frames having lens-retaining grooves without the use of expandable mold cores or other complex molding mechanisms. According to this invention, the cavity between cooperating, separable mold blocks is oriented in a particular manner whereby all surfaces of the cavity are disposed in angular positions relative to the direction of mold block separation whereby the cavity surfaces freely retract, or slide apart, from the molded frame during separation of the mold blocks. In molding some types of grooved frames, it has been found to be advantageous to mold the frame in a discontinuous or separated manner, whereby portions of the frame are deformed from their normal positions during molding to allow correct angular positioning of the surfaces thereof. Subsequently, the deformed portions may easily be deflected into their normal positions and connected to form continuous, lens-surrounding frames. In carrying out this method of molding eyeglass frames, novel frames construction have also been discovered in which new and improved results have been realized. Besides being able to mold common types of eyeglass frames in which the lens-surrounding portions are generally flat or slightly curved and fitted with separate temple pieces, an important feature of this invention resides in being able to mold, for example, the frame as a unitary structure including a resilient lens frame-and-temple member of generally U-shaped configuration adapted to resiliently engage both sides of a wearer's head. In this case, a nose-engaging bridge piece projects downwardly from the central portion of the lens frame-and-temple member, and the lower rim portion, i.e., the lower plastic lens holding portion of the frame, extends laterally from each side of the bridge element beneath an upper rim portion to define an opening for receiving and supporting an elongated rearwardly curved lens member. Opposing lens-retaining grooves are molded in the opposing surfaces of the upper and lower rim portions for engaging and supporting the upper and lower peripheral edges of the respective lenses. The curvature of the lens frame-and-temple member and the resiliency of the lens material effectively retains the lens elements in position so that it is not necessary to provide a lens-retaining groove in the end portions of the lens openings. Preferably, the lens elements are formed from a flat sheet of flexible material; however, if desired, the lens elements may be formed from curved material. The inner ledge of the lens-retaining groove may be terminated at a point spaced from the ends of the elongated lens opening to provide access from the inside of the frame to the lens retaining groove so that the flexible lens may be installed in the lens opening by deflecting the upper and lower rim portions sufficiently to permit the lens to be pressed into position. If desired, the lower rim portion may be molded having a free end which may subsequently be permanently secured to the temple portion of the lens frame-and-temple element. After molding the lens-surrounding frame portion in a discontinuous and deformed manner, the lower rim portion may subsequently be deflected into its normal position and permanently secured in such position. In this manner, frame portions of the mold cavity may be molded by simple mold blocks without resorting to the more complicated mechanism for producing irregular molded surfaces such as grooves.

In some instances, the lens retaining groove is not required in the vertical portion of the lens opening, the entire frame structure may be injection molded as a unitary element without encountering the normal difficulties in forming an undercut groove around the entire periphery of a lens opening.

Other objects and advantages of the invention will become apparent from the following description taken with the drawings in which:

FIG. 7 is a fragmentary sectional view taken on line 7—7 of FIG. 5 and illustrating the configuration of the upper and lower injection mold blocks;

FIG. 8 is a view similar to FIG. 7 but taken on line 8—8 of FIG. 5;

FIG. 9 is a view similar to FIG. 7 but taken on line 9—9 of FIG. 5;

FIG. 10 is a view similar to FIG. 7 but taken on line 10—10 of FIG. 5;

FIG. 11 is a view similar to FIG. 7 but taken on line 11—11 of FIG. 5;

Figure 4:
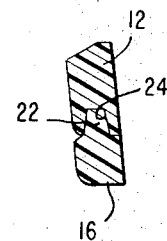
FIG. 4 is a vertical section view taken along line 4—4 of FIG. 1.

Referring now to the dawings in detail, an improved sunglass assembly manufactured in accordance with the present invention includes a unitary resilient lens frame-and-temple member 10 having temple portions 12 adapted to engage each side of a wearer's head. A nose-engaging bridge piece 14 depends downwardly from the central portion 15 of the lens frame-and-temple member 10. Since the structure is symmetrical about a vertical center plane passing through the bridge piece, only one side of the assembly will be described in detail. In the drawings, identical reference numerals are used to designate similar parts or opposed sides of the structure. An integrally molded plastic rim 16 projects from the side of the bridge piece 14 and extends generally parallel to and spaced beneath an upper rim portion 11 and a part of the temple portion 12, of the lens frame-and-temple member 10. The lower rim portion 16 terminates in a free end having a convex end surface 18, and is adapted to be received in a slot 24 integrally molded in the concave surface area 20 of the temple element 12 as shown in FIG. 4. With the lug 22 secured in the slot 24, the lower rim portion 16 cooperates upper rim portion 11 of the lens frame-and-temple member 10 to define a lens retaining opening in the eyeglass frame, the lens opening extending across the front or bow portion of the frame and rearwardly along the temples of the wearer in position to shield the wearer's eyes from peripheral glare.

The lower rim portion 16 is formed with an upwardly directed groove 25 in its upper surface to provide inner and outer lens retaining shoulders 26, 27 for engaging the peripheral edge of an elongated flexible lens element 28. Similarly, the upper rim portion 11 has a downwardly directed groove 301 formed in a portion of its lower surface in opposition to the groove 25, to thereby provide inner and outer shoulders 31, 32, respectively for engaging the upper peripheral edge of the lens 28 to retain the lens in the lens opening between the upper rim portion 11 and the lower rim portion 16. The bridge element 14 acts as a stop by engaging the end of the elongated lens element 28 to retain the lens against axial sliding movement when positioned in the lens opening.

Referring now to FIGS. 5 through 11, it is seen that the eyeglass frame described may be injection molded as a unitary structure from a single homogeneous mass of thermoplastic synthetic resin material without necessitating the use of complex molding equipment or techniques. This is made possible by the unique design of the frame structure which provides firm, positive support for the lens members without the necessity of the undercut groove completely encircling the periphery of the lenses. This makes it possible for the frame to be injection molded in a separable mold block assembly having a mold cavity completely devoid of undercut portions.

Figure 6:
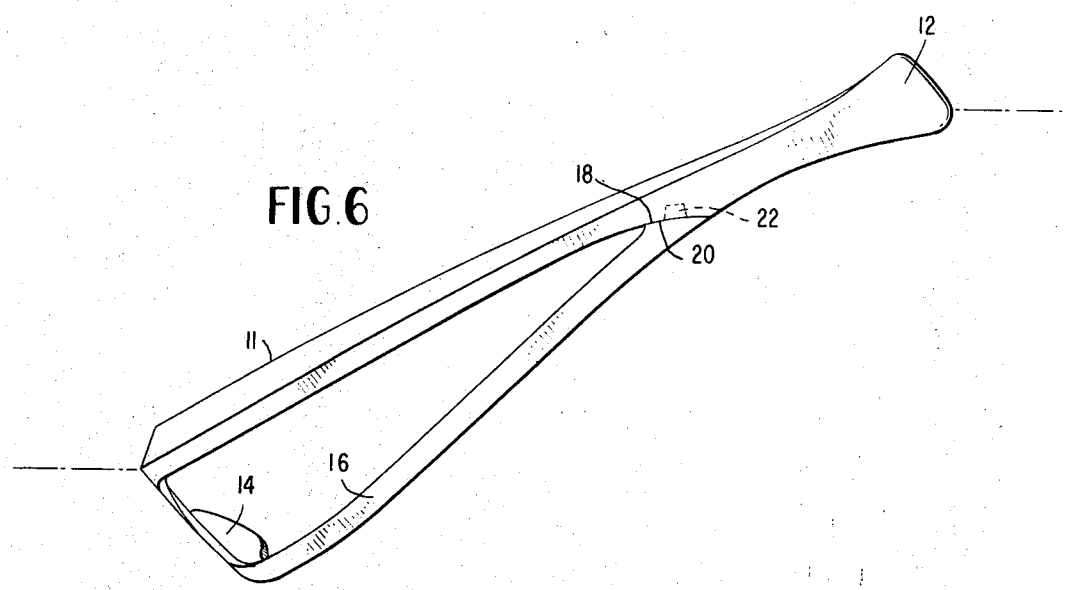
FIG. 6 is a side elevation view of the frame shown in FIG. 5, with the injection mold part line shown in phantom.

In molding the above-described novel frame, as well as other different types of frames, a pair of separable mold block elements 35, 36 are provided, with each having a cavity portion therein adapted to cooperately define a mold cavity in the configuration of the eyeglass frame when the mold blocks are in the closed position. As illustrated in FIG. 6, the mold blocks are shaped to separate along the temple portions of the mold cavity, which temple portions are disposed at a substantial mold angle with respect to the direction of the movement of the upper mold block 35 to open and close the mold, this direction of movement being assumed, for convenience of description, to be in the vertical direction. With a mold angle of approximately 30° as illustrated in FIG. 6, all upwardly and inwardly directed or inclined surfaces of the bridge piece and the lower rim portion are offset horizontally with respect to the upper rim and temple portions so that all upwardly and inwardly directed or inclined surfaces of the lens frame-and-temple member, the bridge piece or the lower rim portions may be molded by the upper mold block 35. Similarly, all downwardly directed or inclined surfaces may be shaped by the lower mold block 36.

Figure 1:
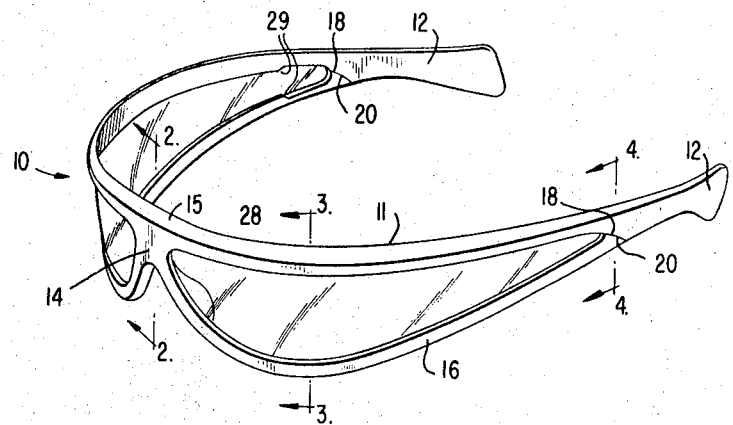
FIG. 1 is a perspective view a unitary U-shaped eyeglass assembly in accordance with the present invention.
Figure 2:
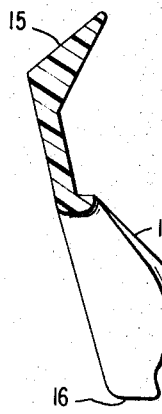
FIG. 2 is a vertical section view taken along line 2—2 of FIG. 1.
Figure 3:
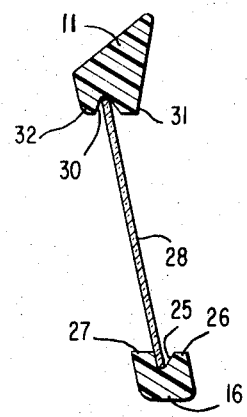
FIG. 3 is a vertical section view taken along line 3—3 of FIG. 1.
Figure 5:
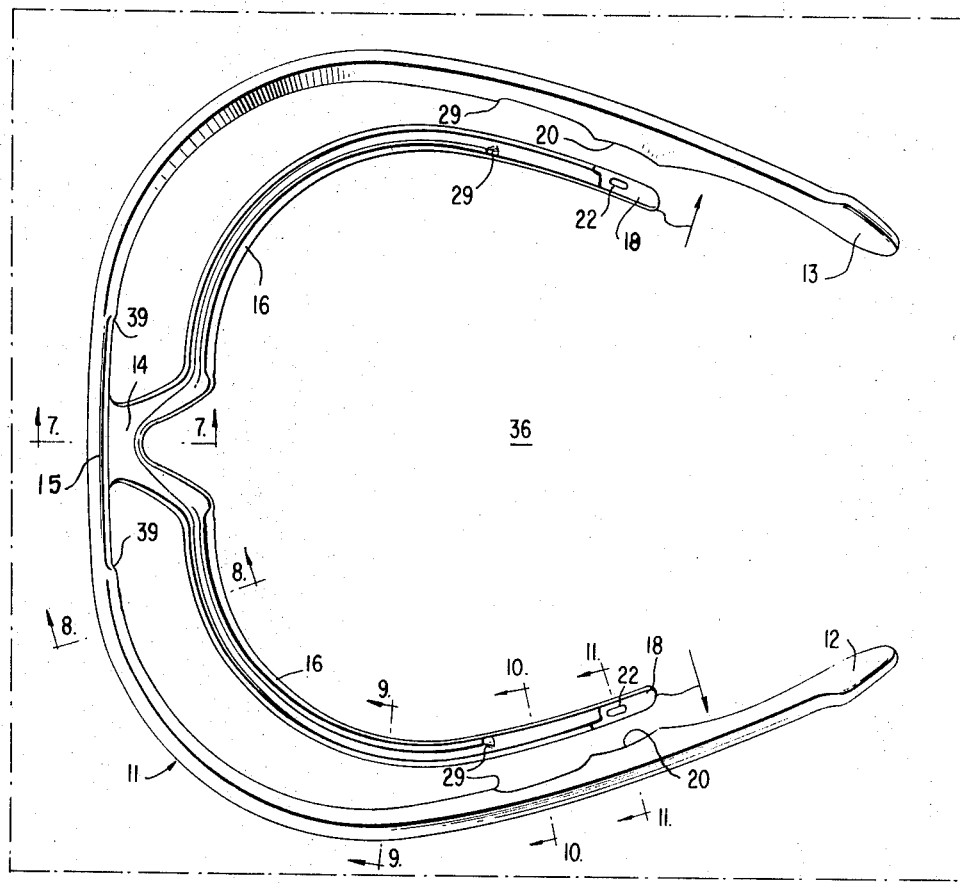
FIG. 5 is a plan view of a unitary molded frame element of the type employed in the sunglass assembly shown in FIG. 1, with the lower injection mold employed to form the frame element being shown in phantom.

As shown in FIG. 5, the free ends of the lower rim portion 16 may be initially molded in a position spaced inwardly from the temple elements to avoid any undercut in this area. Thus, the normally continuous lens-surrounding frame portion is molded in a discontinuous and deformed manner. After the frame is removed from the mold, the relatively flexible lower rim portions are easily deflected into alignment with temple member and secured thereto by the lug 22 and slot 24 as shown in FIGS. 1 and 4. Referring specifically to FIGS. 1 and 7 through 11, it is seen how the various surfaces of the frame structure are formed by the upper and lower mold block, respectively. Referring first to FIG. 7, the normal separation line of the mold block is indicated by the phantom line 40 extending to the left and right of the frame structure. From this view, it is apparent that there are no undercut portions in the area of the bridge piece of the frame structure. In FIGS. 7 through 11 the sections of the frame structure are illustrated in the exact position relative to one another in which they are formed in the mold blocks, with the arrow directed to the two phantom lines extending between the various segments of the frame structure indicating the movement of the lower rim portion relative to the temple in order to position the free end of the rim with the lug 22 in the slot 24 of temple 12. It is apparent from these five views, taken together, that there are no undercut positions of the mold cavity forming the upper rim and temple portions and the lower rim portion. Thus, it is apparent that the frame structure may be injection molded by conventional molding apparatus without the necessity of special collapsible or flexible mold elements to form undercut portions or lens-retaining grooves in the frame structure. According to this invention, each mold cavity surface is freely retractable over corresponding molded frame surfaces during separation of the mold blocks 35 and 36.

In molding some shapes of eyeglass frames, such as that shown in FIGS. 1, 5 and 6, it may be necessary or desirable to mold the lens-surrounding frame portion in a discontinuous manner so that all surfaces may easily be reached without the necessity of undercut.

After the frame structure has been molded, the lens elements 28 may be inserted in the lens openings, with the upper and lower edges thereof disposed in the grooves 30 and 25 respectively, before the free end of the lower rim portion 16 is permanently assembled to the temple element 12. Alternatively, the lower rim portion may be secured to the temple element then deflected downwardly slightly to permit the flexible lens element 28 to be inserted between the upper rim portion 11 and the lower rim portion 16. When the lens 28 is to be installed after the lower rim portion is secured to the temple, it is preferable that the inner shoulders 26 and 31 be terminated at a point spaced from the ends of the lens opening, as at 29, 39 of FIG. 5 to permit the lens to be more loosely inserted in the opening. It should be understood that lens-surrounding frame portions without temple elements can easily be molded by the method described here, whether the frame is curved as shown, or flat.

Figure 12:
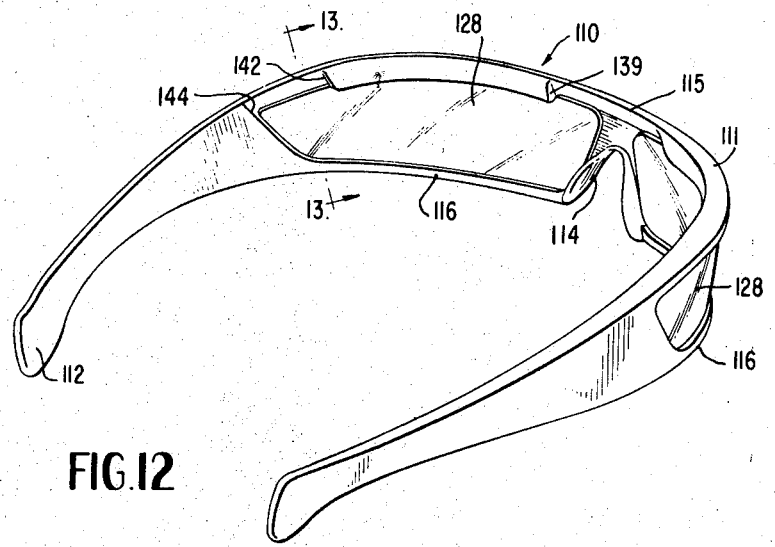
FIG. 12 is a perspective view of an alternate embodiment of the sunglass assembly.
Figure 13:
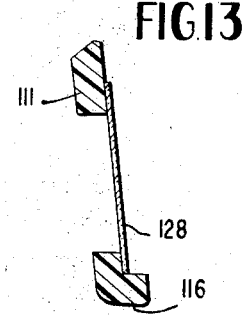
FIG. 13 is a fragmentry sectional view but taken on line 13—13 of FIG. 12.

Referring now to FIG. 12 an alternate embodiment of the invention is shown as including a lower rim portion 116, having one end integrally molded with the bridge piece 114, and having the other end integrally molded with the temple portion 112 of lens frame-and-temple member 110. As illustrated in FIG. 13, the frame structure of this embodiment may, nevertheless, be injection molded in the manner described above by reducing the section of the temple element near the rearwardly directed end of the lens opening. This reduced section, in combination with the relatively high mold angle avoids an undercut portion in the mold cavity in this area. To produce reduced section, the lens-relating groove in the upper rim portion 111 is eliminated from the shoulder 142 to the rearward end of the lens opening and from the shoulder 139 to the central portion 115. However, since the lens element 128 is preferably formed of resilient, normally flat sheet material and deflected into a curved configuration for insertion into the lens retaining groove, the normal resiliency of the lens 128 will urge the end of the lens into firm engagement with the temple member in this area. Also, elimination of the lens-retaining groove near the ends of the lens opening makes it possible to insert the lens without requiring excessive stress on the frame or excessive deflection of the lens. A shoulder 144 engaging the rearward end of the lens 128, and the bridge element 114 positively retain the lens against axial sliding movement within the lens opening.

In this alternate embodiment of the invention, the frame may be deflected slightly to separate the upper and lower rim portions to permit the lens element to be installed in the lens opening. Alternatively, by shaping the lens opening so that its upper and lower edges are substantially parallel, the end of the lens may be inserted in the lens opening at the end thereof where the lens retaining groove is eliminated, then physically slid along the grooves to position the lens in the frame.

I claim:

1. An eyeglass frame and lens assembly comprising a unitary resilient lens frame-and-temple member of generally U-shaped configuration comprising a lens frame portion and a pair of integral temple portions adapted to resiliently engage both sides of wearer's head, a nose engaging bridge piece integrally molded with the lens frame portion of said lens frame-and-temple member, said frame having formed therein a pair of elongated lens openings extending from adjacent said bridge piece on each side thereof the full width of said lens frame portion and terminating in the temple portions of said lens frame-and-temple member said opening having their their upper and lower extremities defined, respectively, by an upper rim portion of the lens frame-and-temple member and by an elongated lower rim portion of the lens frame-and-temple member integrally molded from the the same homogeneous mass of material with said resilient lens frame-and-temple member and extending from said bridge piece beneath said upper rim portion, each of said lower rim portions terminating in a free end beneath said temple portion of said lens frame-and-temple member, means securing each said free end to said temple portion along a non-planar engaging surface in the opposing edge of said upper and lower rim portions of said lens frame-and-temple member having formed therein a groove defined by inner and outer lens-retaining ledges along the upper and lower extremities of said lens openings, at least one of said inner lens-retaining ledges of said groove terminating a substantial distance before at least one end of each of said elongated lens openings to allow insertion of a lens member in said lens openings after said free ends of said lower rim portion are secured to said temple portions.

2. The eyeglass frame according to claim 1 including a lens member mounted within each of said lens openings.

3. The eyeglass frame according to claim 2 wherein said lens members are of flexible material.

4. An eyeglass frame comprising a unitary resilient lens frame-and-temple member of generally U-shaped configuration comprising a lens frame portion and a pair of integral temple portions adapted to resiliently engage both sides of wearer's head, a nose engaging bridge piece integrally molded with the lens frame portion of said lens frame-and-temple member, said frame having formed therein a pair of elongated lens openings extending from adjacent said bridge piece on each side thereof the full width of said lens frame portion and terminating in the temple portions of said lens frame-and-temple member, said openings having their upper and lower extremities defined, respectively, by an upper rim portion of the lens frame-and-temple member and by an elongated lower rim portion of the lens frame-and-temple member integrally molded from the same homogeneous mass of material with said resilient lens frame-and-temple member and extending from said bridge piece beneath said upper rim portion, each of said lower rim portions terminating in a free end beneath said temple portions of said lens frame-and-temple member, means securing each said free end to said temple portion further comprising a lug integrally molded on said free end portions of said lower rim portions and a mating depression molded in said temple portions, said lugs being positioned to be received in said depressions when said free ends are secured to said temple portions, opposing edges of said upper and lower rim portions of said lens frame-and-temple member having formed therein a groove defined by inner and outer lens-retaining ledges along the upper and lower extremities of said lens openings, at least one of said inner lens-retaining ledges of said groove terminating a substantial distance before at least one end of each of said elongated lens openings to allow insertion of a lens member in said lens openings after said free ends of said lower rim portions are secured to said temple portions.

5. The eyeglass frame according to claim 4 including a lens member mounted within each of said lens openings.

6. The eyeglass frame according to claim 5 wherein said lens members are of flexible material.

References Cited

UNITED STATES PATENTS 2,907,041 10/1959 Finn _____ 351—47 X
3,356,439 12/1967 Magnus _____ 351—44 X DAVID SCHONBERG, Primary Examiner J. W. LEONARD, Assistant Examiner U.S. Cl. X.R.

351—47